US005988672A

United States Patent [19]
VanDenberg

[11] Patent Number: 5,988,672
[45] Date of Patent: Nov. 23, 1999

[54] SUSPENSION SYSTEM WITH INTEGRAL BOX BEAM

[75] Inventor: Ervin K. VanDenberg, Massillon, Ohio

[73] Assignee: Meritor Heavy Vehicle Suspension Systems, Inc., Troy, Mich.

[21] Appl. No.: 08/908,109

[22] Filed: Aug. 11, 1997

[51] Int. Cl.[6] .......... B60G 5/00
[52] U.S. Cl. .......... 280/683; 280/124.11
[58] Field of Search .......... 280/678, 683, 280/124.11

[56] References Cited

U.S. PATENT DOCUMENTS

| | | | |
|---|---|---|---|
| 2,848,248 | 8/1958 | Hansen et al. . | |
| 3,133,745 | 5/1964 | Granning | 280/112 |
| 3,155,397 | 11/1964 | Stump et al. | 280/683 |
| 3,689,102 | 9/1972 | Granning | 280/112 R |
| 3,713,663 | 1/1973 | Granning | 280/112 R |
| 3,747,948 | 7/1973 | Granning | 280/112 R |
| 3,887,025 | 6/1975 | Kaltwasser . | |
| 4,171,830 | 10/1979 | Metz | 280/711 |
| 4,783,096 | 11/1988 | Ramsey et al. . | |
| 4,911,417 | 3/1990 | Short . | |
| 5,127,668 | 7/1992 | Raidel | 280/683 |
| 5,366,237 | 11/1994 | Dilling et al. | 280/711 |
| 5,403,031 | 4/1995 | Gottschalk et al. | 280/704 |

FOREIGN PATENT DOCUMENTS

| | | |
|---|---|---|
| 952136 | 7/1974 | Canada . |
| 1530566 | 3/1970 | Germany . |
| 1389149 | 11/1973 | Germany . |

OTHER PUBLICATIONS

Granning Suspension Systems, Truck Suspension Brochure, Feb. 1, 1983.

*Primary Examiner*—Kenneth R. Rice
*Attorney, Agent, or Firm*—Howard & Howard

[57] ABSTRACT

A vehicle suspension system having a box shaped beam having a top plate, a bottom plate, a front plate and a pair of end plates. The top plates and bottom plates are spaced apart a distance substantially equal to the axle height and are securely welded thereto along both the top and bottom of the axle. A pair of axially aligned and spaced apart pivots are secured intermediate the top plates and bottom plate, and receive a pivot pin for mounting the box beam to a vehicle. Each pivot includes a bushing, which, in an alternative embodiment, includes a horizontal spring rate, a vertical spring rate and an axial spring rate. Additionally, the top plate and bottom plate are welded to the axle along a substantial portion of the length thereof for substantially reducing torque in the axle, and for significantly reducing bending stresses felt by the axle. In an alternative embodiment, the sidewalls are integrally formed with the top and bottom walls for ease of manufacture.

23 Claims, 7 Drawing Sheets

SUSPENSION SYSTEM WITH INTEGRAL BOX BEAM

BACKGROUND OF THE INVENTION

1. Technical Field

The invention relates generally to an improved suspension system for land vehicles. More particularly, the invention relates to trailing beam air suspension systems. Specifically, the invention relates to trailing beam air suspension systems whereby the trailing beams are interconnected to form a single unitary beam.

2. Background Information

With the advent following World War II of large load carrying capacity trucks and trailers in this country, came the need to provide vehicle with multiple axles for increasing the capacity of trucks over that of previously existing designs. While the use of additional axles effectively increased load-carrying capacity, it was soon realized that as the number of load bearing axles increased on a given vehicle, a number of difficulties arose. Specifically, tire scuffing, loss in fuel economy and the inability to safely corner, all work problems associated with multiple axle vehicles. Mitigation of these problems was a primary concern to the industry, which concern resulted in the development of a variety of suspension systems, both liftable and non-liftable.

Liftable suspensions could be selectively raised from the road surface or lowered into engagement with the road surface when needed, thereby mitigating a number of the aforementioned problems. Additionally, non-liftable axles have been designed for a variety of purposes, and specifically a number of specialty chassis-cab type vehicles require additional load-carrying capacity. More specifically, auxiliary suspension systems are necessary for trash compactor trucks and concrete mixing and delivery vehicles.

The transportation of goods by truck continues to be a primary method of moving goods from one location to another. This commercial success is due to the large volume and load carrying capacity available in standard chassis-cab trucks as well as in tractors which are attached via a fifth wheel to trailers. The commercial success of the trucking industry is also benefited by an extensive highway system which reaches virtually every part of North America.

Suspension systems may take a variety of forms, including parallelogram suspensions, and leading and trailing beam-type suspensions. Generally, leading and trailing beam-type suspensions include a pair of longitudinally extending beams which may be either flexible or rigid, one of which is located adjacent each of two longitudinally extending frame rails located beneath the body of the truck or trailer. These beams are pivotally connected at one end to a hanger bracket extending downwardly from the frame, with an axle extending between the beams adjacent the other end. Additionally, an air or coil spring is generally positioned intermediate each frame rail and a corresponding beam. The beam may extend forwardly or rearwardly of the pivot, thus defining a leading or trailing beam suspension respectively.

Beam-type suspension systems are used on a significant number of trucks and trailers, and must have sufficient strength to resist lateral and axial deflection while remaining stable. Lateral forces act on a suspension system in a variety of ways with the most common being that lateral forces act on a suspension as a vehicle negotiates a turn. As the vehicle turns, shear stress acts between the tire and the road surface causing a lateral stress to be transferred through the tire-wheel assembly to the axle. The axle, being rigidly attached to the suspension, transfers the lateral force into the beam causing it to deflect laterally. This lateral deflection can be extreme, and under certain loading conditions, can cause the tires to contact the vehicle frame rails.

Roll stability refers to the counter-acting forces operating on the ends of an axle causing one end of the axle to raise relative to the frame a distance greater than the other end of the axle. Roll flexibility is encountered when the vehicle frame tilts or rolls relative to the axle; for example, when the vehicle negotiates a turn such that the centrifugal and acceleration forces reduce the downward forces acting on the inside wheel of the turn, and increase the downward force acting on the outside wheel of the turn. Roll flexibility is also realized when the axle moves relative to the frame; for example, during diagonal axle walk.

Diagonal axle walk occurs when the wheels of the opposite ends of the axle encounter unlike irregularities in a road or off-the-road surface, such as when one wheel rides over a curb. As the wheel rides over the curb, an upward force acts on that wheel, and a counteracting downward force acts on the wheel not riding over the curb. If the suspension is unable to provide flexibility between the axle and the frame as the tire-wheel assembly travels over the curb or ground irregularity, or alternatively to provide flexibility between the axle and the frame as the vehicle negotiates a turn, the suspension will be too roll rigid, and may cause axle breakage or over stress vehicle components, such as the frame. As such, beam-type suspensions must be roll stable while providing sufficient vertical support to retain the vehicle above the road surface.

An additional problem associated with trailing beam type suspensions is the increased torque load which is input into the axle. More specifically, inasmuch as the beams are spaced apart a distance from 35 inches to 41 inches, and each beam pivot point receives between 20,000 and 30,000 pounds of force when engaging in roll or diagonal axle walk, with each beam length being approximately 20 inches, it is not uncommon for the axle to be subjected to 50,000 foot pounds of torque in the area intermediate the respective leading or trailing beams. The axle is thus subjected to extremely high torque loads substantially affecting the axle and its operational characteristics. Additionally, the central portion of the axle positioned intermediate the trailing beams is not reinforced, thereby further affecting the axle resistance to torque load.

The need thus exists for a suspension system which is lightweight, is roll stable, and provides adequate vertical load-carrying characteristics, and which is resistant to lateral and longitudinal axle forces. Additionally, the need exists for a suspension system which provides an axle to beam connection which is lightweight, easy to assemble, simple to manufacture and easy to align relative to the vehicle path of travel. Still further, the need exists for a suspension system which may be utilized as a tag axle, or alternatively as an auxiliary axle beneath a usual truck or trailer. The need also exists for a suspension system which substantially eliminates axle torque while strengthening the central portion of the axle.

SUMMARY OF THE INVENTION

Objectives of the invention include providing vehicle suspension system which is roll stable, and resistant to lateral and longitudinal forces.

Another objective is to provide a vehicle suspension system which may be utilized as either an auxiliary suspension system or a principal suspension system beneath a usual truck or trailer.

Still another objective is to provide a vehicle suspension system which may be utilized as both a liftable and a non-liftable suspension system.

A further objective is to provide a suspension system which provides a unitary trailing beam structure.

Yet another objective is to provide a suspension system which provides a single beam suspended from the hanger brackets and which eliminates the need for control arms to control axle location.

A still further objective is to provide a suspension system which provides a single beam pivoted about a pair of axially aligned pivot points where each pivot point is bushed.

Yet another objective is to provide a suspension system which includes bushings which provide varying vertical and horizontal spring rates.

A still further objective is to provide a suspension system which includes a bushing at each pivot which provides a longitudinal spring rate, a vertical spring rate and a lateral spring rate whereby each spring rate varies from the other spring rates.

Yet a further objective is to provide a vehicle suspension system which will operate equally well on most vehicles.

A further objective of the invention is to provide a suspension system which substantially eliminates axle torque while simultaneously strengthening the central portion of the axle.

A still further objective is to provide such a vehicle suspension system which is of simple construction, which achieves the stated objectives in a simple, effective and inexpensive manner, and which solves problems and satisfies needs existing in the art.

These and other objectives and advantages of the invention are obtained by the improved suspension system, the general nature of which may be stated as including a suspension system adapted to be mounted to a vehicle frame comprising: one beam having a forward end and a rearward end; a pair of spaced apart pivots positioned adjacent the forward end of the beam and adapted to pivotally mount the beam to the vehicle frame; an axle; attachment means for securing the axle to the rearward end of the beam; and at least one spring adapted to extend between the vehicle frame and the beam.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
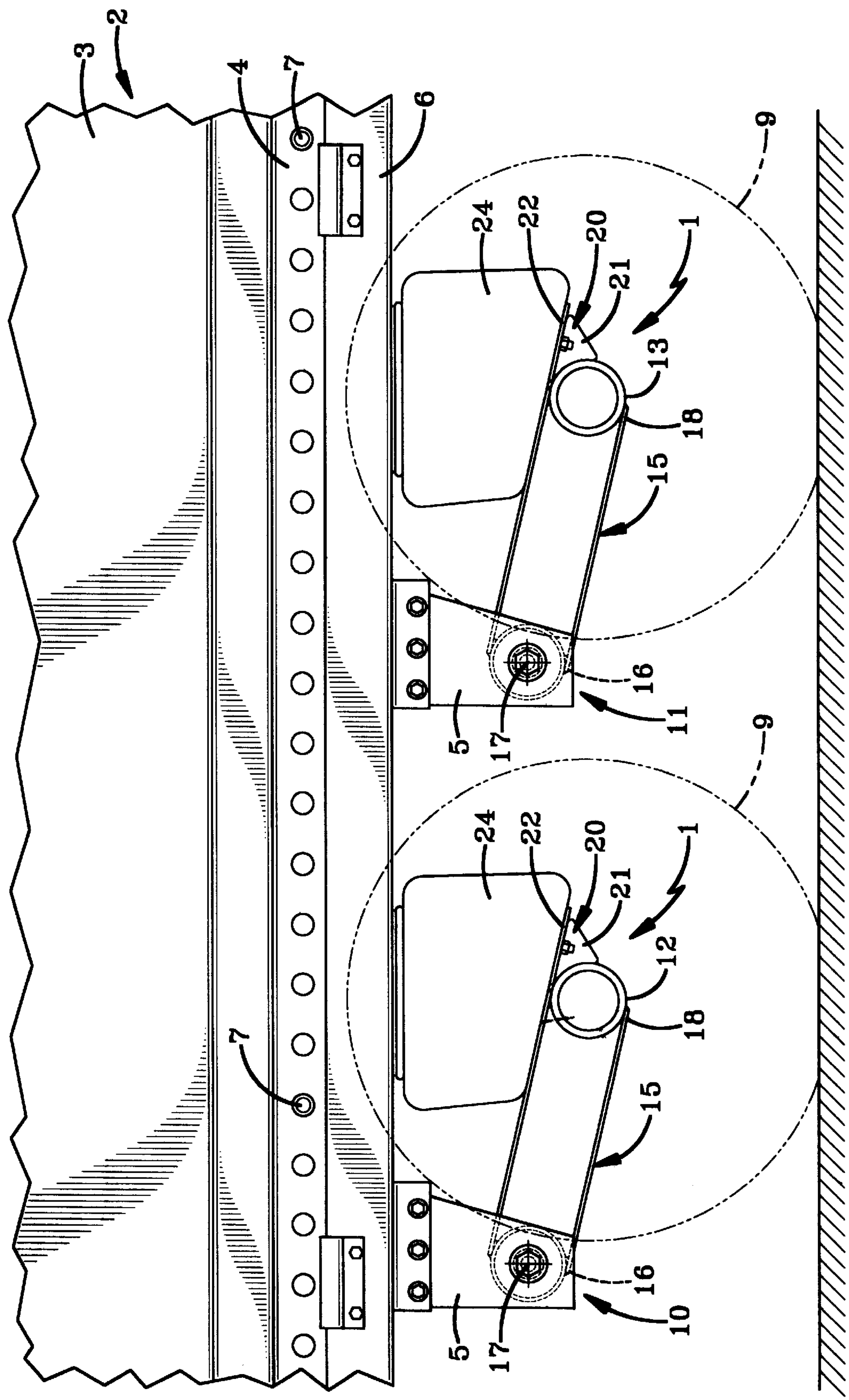
FIG. 1 is a side elevational view of the suspension system of the present invention shown attached to a vehicle with the tire wheel assemblies shown in dot dash lines.

The improved suspension system of the present invention is indicated generally at 1, and is particularly shown in FIG. 1 mounted on a vehicle 2, such as a truck or trailer. Vehicle 2 includes a cargo box 3 supported by a pair of slider rails 4 extending longitudinally beneath vehicle 2. Suspension system 1 includes a pair of hanger brackets 5 welded to a pair of parallel and spaced apart slide channels 6. Slide channels 6 are spaced apart a distance equal to the distance between slider rails 4 and are mounted to slider rails 4 with a plurality of locking pins 7. A forward suspension 10 and a rearward suspension 11 for supporting a forward axle 12 and a rearward axle 13, respectively, are mounted to slide channels 6. Each axle 12 and 13 supports a tire wheel assembly 9 on each end thereof. Inasmuch as both the forward and rearward suspensions 10 and 11 are similar, only forward suspension 10 will be described in detail.

Referring to FIGS. 1–4, forward suspension 10 includes a hollow beam 15 (FIGS. 2–3) having a forward end 16 mounted to hanger brackets 5 along a pivot axis 17, and a rearward end 18 for receiving forward axle 12. A pair of mounting brackets 20 are mounted to rearward end 18 of beam 15 with each mounting bracket 20 including a pair of downwardly extending mounting flanges 21 and an air spring mounting plate 22. An air spring 24 is interposed between each air spring mounting plate 22 and slide channel 6 for supporting vehicle 2 and vertical loads associated therewith.

Figure 3:
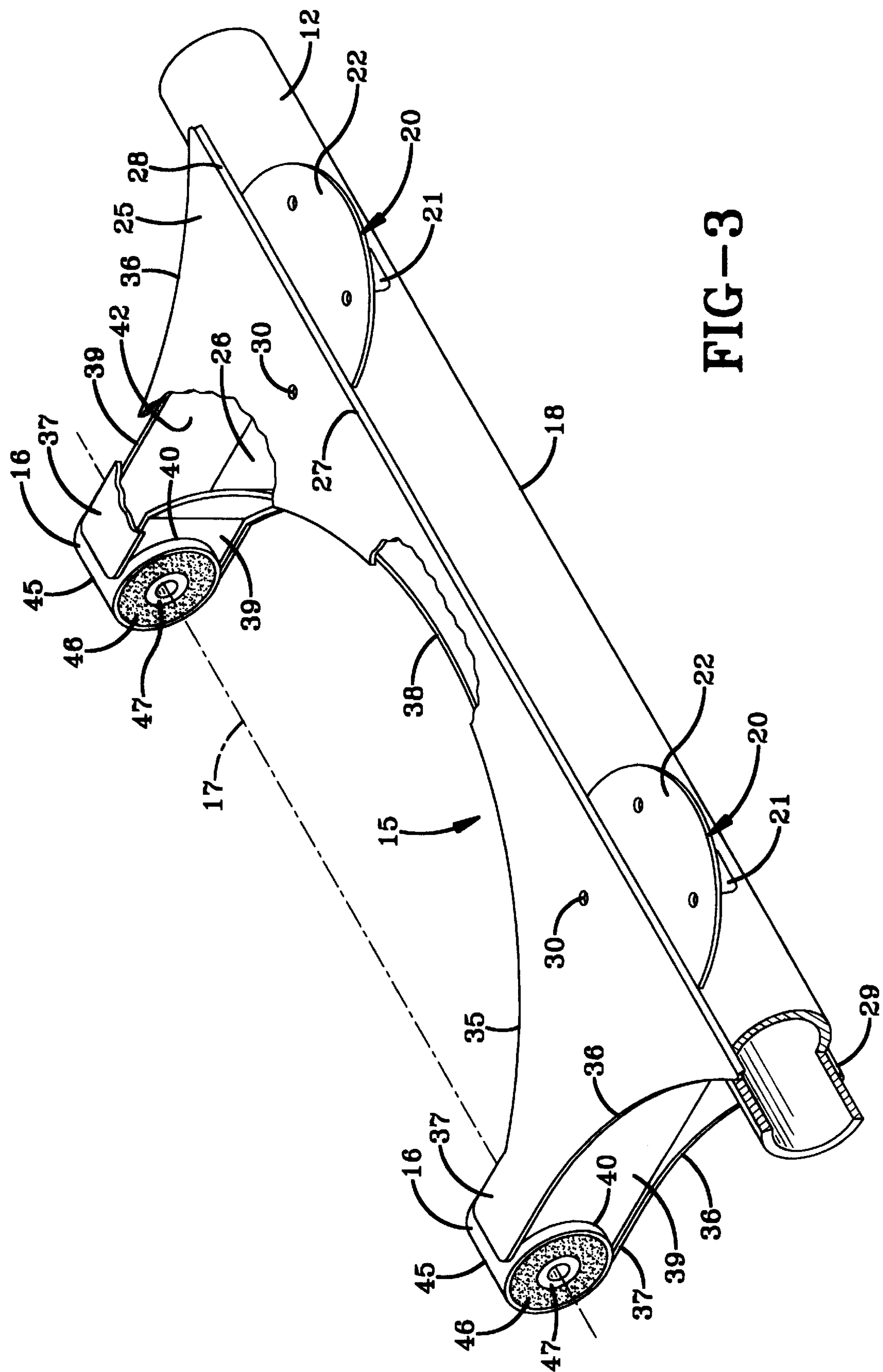
FIG. 3 is an enlarged perspective view of the beam unit shown in FIG. 1 with portions cut away and shown in section.
Figure 4:
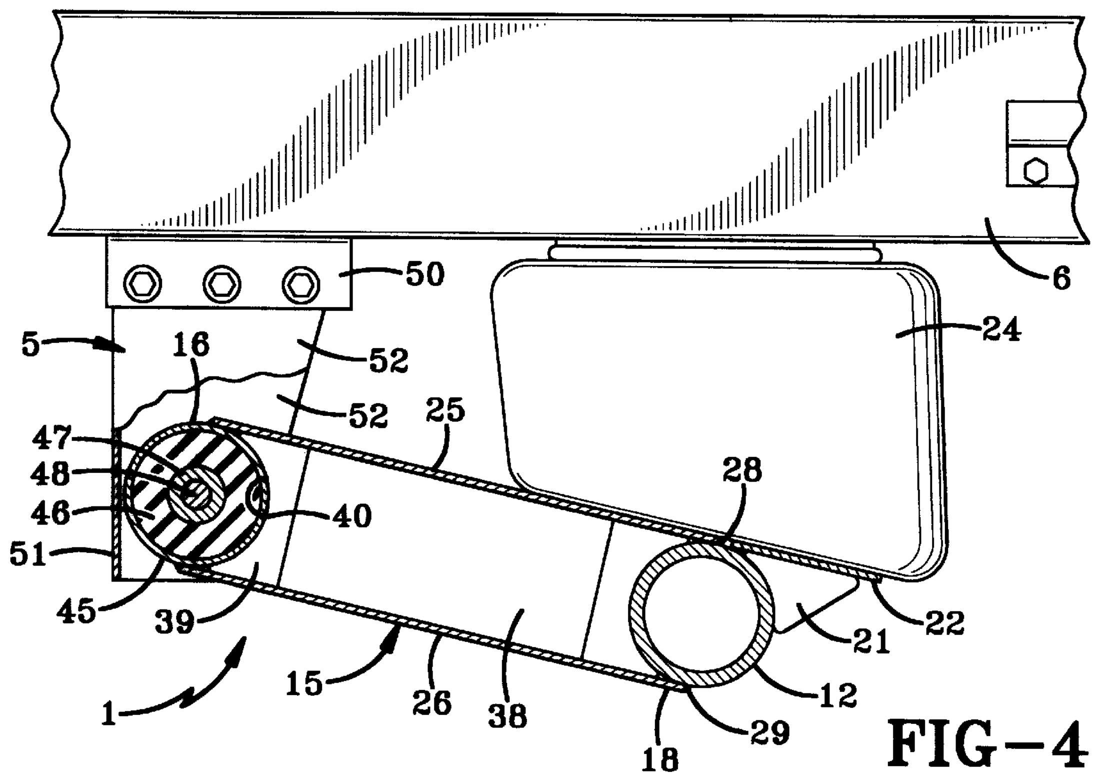
FIG. 4 is a sectional view taken along line 4—4, FIG. 2.

In accordance with one of the main features of the present invention and referring to FIGS. 3 and 4, beam 15 includes a top plate 25 and a bottom plate 26 spaced apart from top plate 25. In the preferred embodiment, plates 25 and 26 are parallel, however, they may be angled relative to one another without departing from the spirit of the invention. Both top plate 25 and bottom plate 26 are formed with rear edges 27 being spaced apart a distance substantially equal to the height of axle 12. Rear edge 27 of top plate 25 is straight and is secured to the top of axle 12 via a weld bead 28 and rear edge 27 of bottom plate 26 straight and is secured to the bottom of axle 12 via a weld bead 29. Weld beads 28 and 29 are parallel and are positioned substantially one on top of the other with respect to axle 12 and extend substantially along the entire length of top plate 25 and bottom plate 26 and along a significant portion of axle 12 for reasons which will be set forth hereinbelow. In accordance with one of the main features of the present invention, axle 12 is thus supported from vehicle 2 via beam 15 such that axle 12 is free of any other supportive interconnection with vehicle 2.

Additionally, as is apparent from a review of FIG. 3, top plate 25 includes a hole 30 positioned adjacent each air spring mounting plate 22 and cooperates with air spring mounting plate 22 to support air springs 24. Top plate 25 and bottom plate 26 are both formed with an inside arcuate edge. Additionally, both top plate 25 and bottom plate 26 are formed with a pair of outside arcuate edges 36 which edges extend arcuately away from the center of beams 15. Inside arcuate edge 35 and outside arcuate edges 36 cooperate to form a pair of parallel and spaced apart mounting tabs 37. A vertical arcuate plate 38 is positioned intermediate inside arcuate edges 35 of plates 25 and 26 and is complimentarily related thereto. Arcuate plate 38 is securely welded along inside arcuate edges 35 of plates 25 and 26 and terminates at arcuate recesses 40. Similarly, a pair of end plates 39 extend between outside arcuate edges 36 of top plate 25 and bottom plate 26. End plates 39 are also substantially vertical with each being securely welded to plates 25 and 26. Each end plate 39 terminates at an arcuate recess 40.

In accordance with one of the main features of the present invention, top plate 25, bottom plate 26, arcuate plate 38, end plates 39 and axle 12 combine to define a rigid box like beam having a hollow interior cavity 42. Additionally, box shaped beam 15 securely retains axle 12 along a significant length thereof via weld beads 28 and 29 positioned along the rear edge 27 of top plate 25 and bottom plate 26. Additionally, axle 12 is securely retained against deflection via weld beads 28 and 29 adjacent top plate 25 and bottom plate 26 and the rigid box beam 15 formed by top plate 25 and bottom plate 26, axle 12, arcuate plate 38 and end plates 39.

Each mounting tabs 37 and pair of arcuate recesses 40 combine to form a mounting recess to receive one bushing sleeve 45. Bushing sleeve 45 is positioned adjacent arcuate recesses 40 of arcuate plate 38 and end plates 39, respectively, as well as intermediate mounting tabs 37 of plates 25 and 26. Each bushing sleeve 45 receives a bushing 46 interferencely fitted therein an inner sleeve 47 is mounted within bushing 46. Each inner sleeve 47 is axially aligned with pivot axis 17 and includes a hole sized to receive a pivot pin 48 (FIG. 4). Bushing sleeves 45 may be spaced apart in the range of from 30 to 60 inches, and more particularly, in the range of from 35 to 50 inches.

Referring to FIG. 4, each hanger bracket 5 includes a mounting base 50, a front wall 51 and a pair of parallel and spaced apart side walls 52. Side walls 52 are parallel and spaced apart a distance equal to the length of bushing sleeve 45 such that each bushing sleeve 45 extends between side walls 52 of a respective hanger bracket 5. Each side wall 52 is formed with an axially aligned hole for receiving pivot pin 48 which is also axially aligned with a hole extending through inner sleeve 47 when beam 15 is mounted to hanger brackets 5.

Operationally, suspension system 1 permits axle 12 to pivot about pivot pins 48 during use and in response to loads inputted into suspension system 1 through tire wheel assemblies 9. Specifically, suspension system 1 may be installed onto a usual vehicle 2 by positioning hanger brackets 22 on either side of slide channel 6 and welding the same thereto. Once suspension system 1 is installed, beam 15 will pivot vertically about pivot pins 48 with air springs 24 maintaining the position of cargo box 3 and any loads associated therewith.

In accordance with one of the main features of the invention, beam 15 offers roll resistance and lateral stability to suspension system 1 via its welded interconnection with axle 12 and its bushed interconnection with hanger brackets 5. As can be seen from a review of FIGS. 1–4, suspension system 1 substantially reduces the torque felt by axle 12 as beam 15 supports axle 12 along substantially the entire length thereof via its interconnection to axle 12 via weld beads 28 and 29, and end plates 39. Specifically, roll and lateral forces input into beam 15 will react at bushings 46, transfer into beam 15, along the length of beam 15, and out of beam 15 through the other bushing 46. In this manner, a U-shaped beam is provided whereby the path of travel of lateral and roll forces input into suspension only partially includes axle 12. As such, the torque on axle 12 is substantially reduced or eliminated. Still further, inasmuch as box shaped beam 15 attaches to axle 12 along a substantially large portion of its length, axle 12 is reinforced through its central region which is, the region most susceptible to deflection as a result of input forces.

Traditionally, axles such as hollow axle 12 would not be secured to a beam within approximately 2 inches on either side of the top center and bottom center of the axle where the top center and bottom center lie on a vertical center line of axle 12 as these portions of the axle are subject to the most deflection and therefore any weld within this region would experience significant stress. Additionally, attaching to the axle adjacent either the top or bottom of the axle will form stress risers which would have a negative effect on the axle in these high deflection areas. However, given that top plate 25 and bottom plate 26 are secured to axle 12 along substantially the entire length thereof, no stress risers are created. More particularly, as a substantially continuous weld beads 28 and 29 assure that axle 12 is an integral part of box shaped beam 15 thereby substantially reducing or eliminating torque felt by the top and bottom of box shaped beam 15, and consequently by axle 12 as axle 12 and box shaped beam 15 share loads transmitted into suspension system 1.

Given the integral connection of axle 12 with the remaining portion of box shaped beam 15, bushings 46 must necessarily provide sufficient compliance to provide a roll stable suspension. More particularly, when suspension system 1 engages in diagonal axle walk or receives roll forces as a result of vehicle 2 negotiating a turn, bushings 46 will provide compliance in accordance with the design characteristics of a particular suspension system 1. Suspension system 1 may be roll rigid or roll compliant depending on the spring rate of bushings 46 as well as the distance therebetween. As one end of axle 12 is raised, bushings 46 will offer resistance, and transfer roll loads through box shaped beam 15 into the opposing bushing 46 and returning such force into the vehicle frame. As can be seen, inasmuch as box shaped beam 15 is attached to axle 12 adjacent its central portion, and along a large portion of its length, very little torque is imparted into axle 12, but rather axle 12 is subject primarily to bending loads as a result of the movement of central beam 15 relative to entire wheel assemblies 9. This bending movement is strongly resisted via the inner connection of axle 12 and beam 15 through weld beads 28 and 29.

Figure 2:
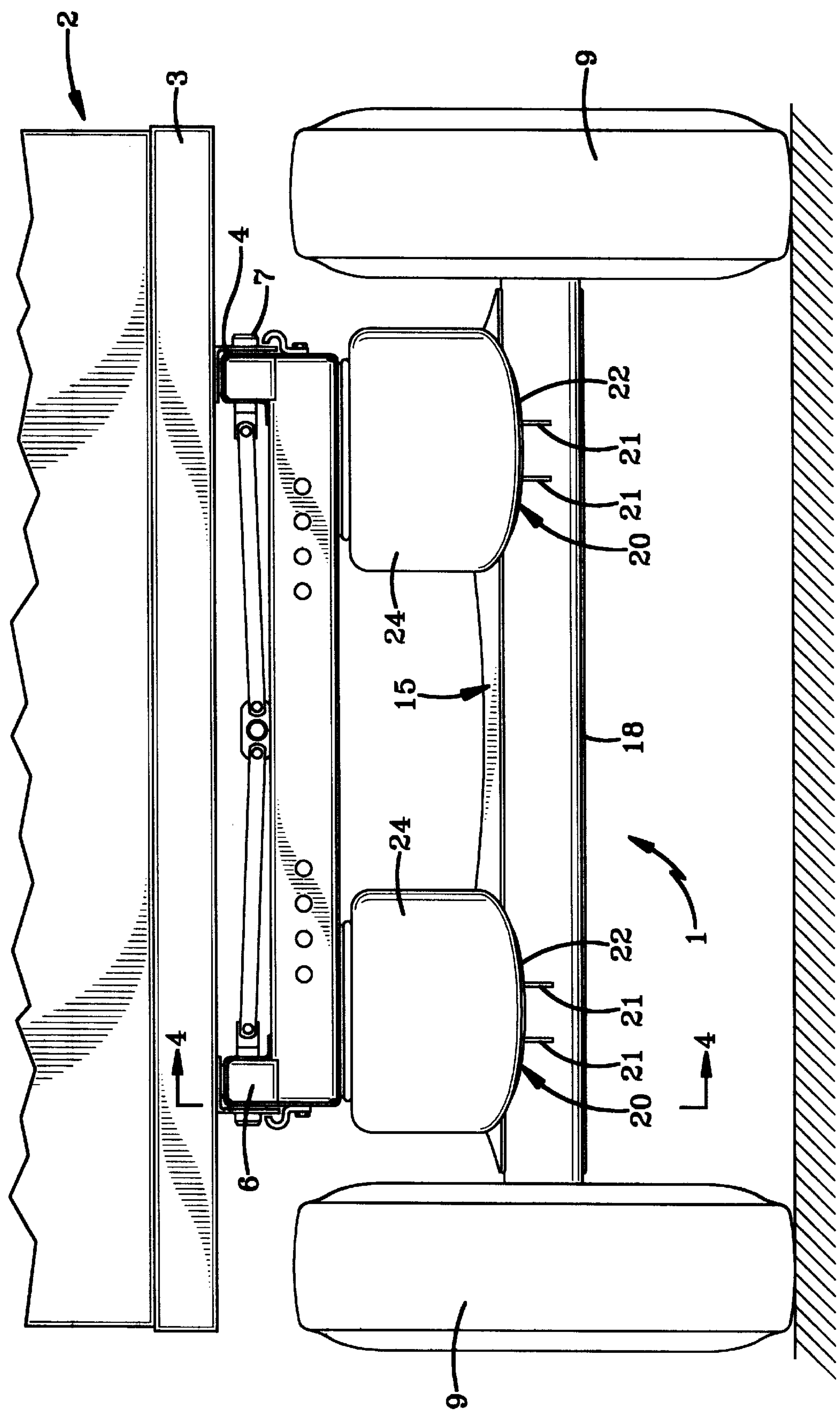
FIG. 2 is a rear elevational view of the suspension system shown in FIG. 1.

As can be seen from a review of FIGS. 2–4, suspension system 1 substantially reduces the torque felt by axle 12 as box shaped beam 15 attached to axle 12 provides a single input into axle 12 when compared to a traditional trailing beam type suspension system of separate trailing beams. More particularly, roll forces are input into a traditional trailing beam suspension in the range of from 20,000 to 30,000 pounds. Inasmuch as a usual beam length is 20 inches long and applying the formula FL/12 where F is force and L is beam length, the axle often experiences 50,000 foot pounds of torque between the trailing beams. However, inasmuch as a single beam is provided at a position substantially central to the axle, torque is transmitted through the beam to the central portion of the axle and does not transmit from one beam, through the axle, to the other beam. As such, the torque on axle 12 is substantially reduced.

Similarly, when lateral force is applied to tire wheel assemblies 9, for example, when vehicle 2 negotiates a turn, a forward edge of one bushing 46 and a rear edge of the other bushing will move into compression thereby offering resistance to the movement of axle 12 as a result of the horizontal spring rate of bushings 42. However, when longitudinal forces are input into tire wheel assembly 9, for example, when the box shaped beam 15 and associated tire wheel assembly 9 encounter an irregularity in the road surface, or abuts an upstanding wall, such as a curb, a rigid inner connection between axle 12, top plate 25, bottom plate 26, arcuate plate 38 and end plates 39 will offer significant resistance against this movement. As can be seen, suspension system 1 offers a roll stable suspension which may be roll flexible or roll rigid depending on the vertical spring rates of bushings 46 and the distance between bushing sleeves 45. Additionally, suspension system 1 is resistant to lateral force as a result of the distance between bushings 46 and the fixed inner connection between axle 12 and the remaining portion of box shaped beam 15. Additionally, as lateral forces input into suspension system 1, the force reacts at bushings 46 and suspension system 1 will translate laterally only a minimum distance given the rigid inner connection between each bushing 46 through plates 25 and axle 12.

Figure 5:
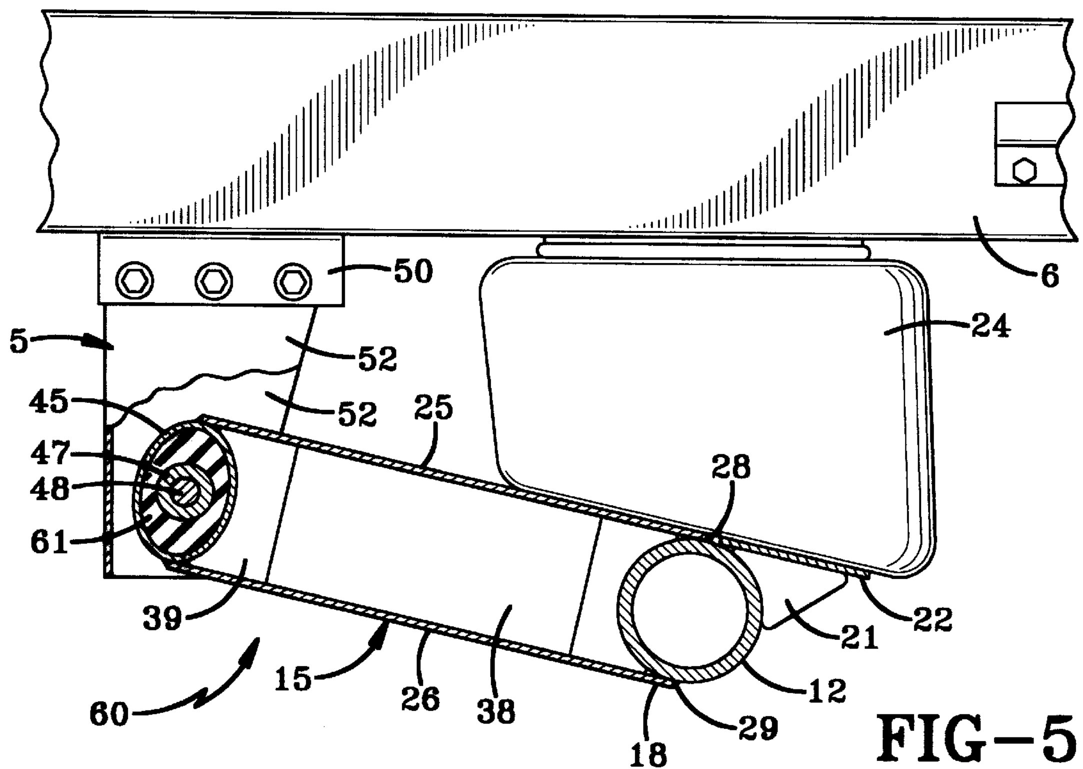
FIG. 5 is a sectional view taken along line 4—4, FIG. 2 but with an alternative bushing.

Additionally, the spring rate of bushing 46 may be varied in order to increase or decrease the roll compliance of suspension system 1 and thereby offer a roll stable suspension to vehicle 2 as discussed above. Still further, bushing 46 may be manufactured with varying spring rates. Referring to FIG. 5, a suspension system 60 is shown which is similar to suspension system in every respect except that bushing 61 is oval in shape and thus includes a vertical spring rate, and a horizontal spring rate different from the vertical spring rate, as well as an axial spring rate which differs from both the horizontal spring rate and vertical spring rate thereby assuring that suspension system 1 may be tailored to meet the particular needs of vehicle 2. More specifically, bushing 61 is elliptical in shape and thus provides more resilient material between the pivot pin and bushing sleeve 45 in the vertical direction than in the horizontal direction. Additionally, the axial spring rate may be varied with respect to both the longitudinal and vertical spring rate by merely changing the durometer of the material as well as the length of the bushing.

Figure 6:
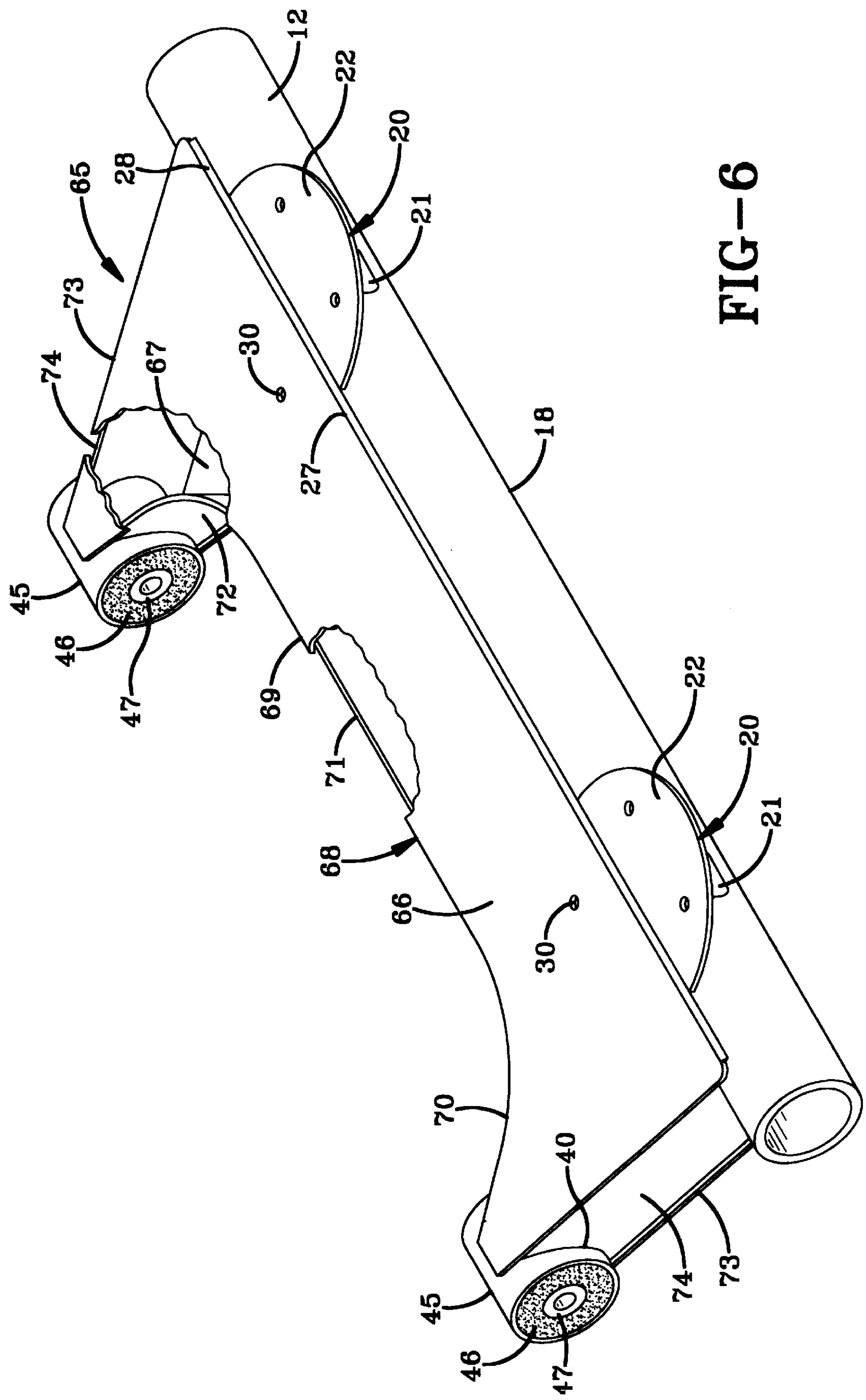
FIG. 6 is an enlarged perspective view of the beam unit of a second embodiment of the present invention with portions broken away and shown in section.

Referring particularly to FIG. 6, an alternative beam 65 for inclusion with suspension system 1 is shown. Beam 65 is similar to box shaped beam 15 in every respect except that beam 65 includes a top plate 66 and a bottom plate 67 each formed with a front edge 68 having a straight central section 69 and arcuate ends 70. Additionally, a front plate extends vertically between top plate 66 and bottom plate 67 and also includes a straight central section 71 and arcuate end sections 72. Still further, both top plate 66 and bottom plate 67 include substantially straight edges 73 with vertical end walls 74 extending therebetween. Beam 65 operates substantially identical to beam 15 when included in suspension system 1 except that it provides an alternative beam design to permit varying roll characteristics and manufacturing capabilities.

Figure 7:
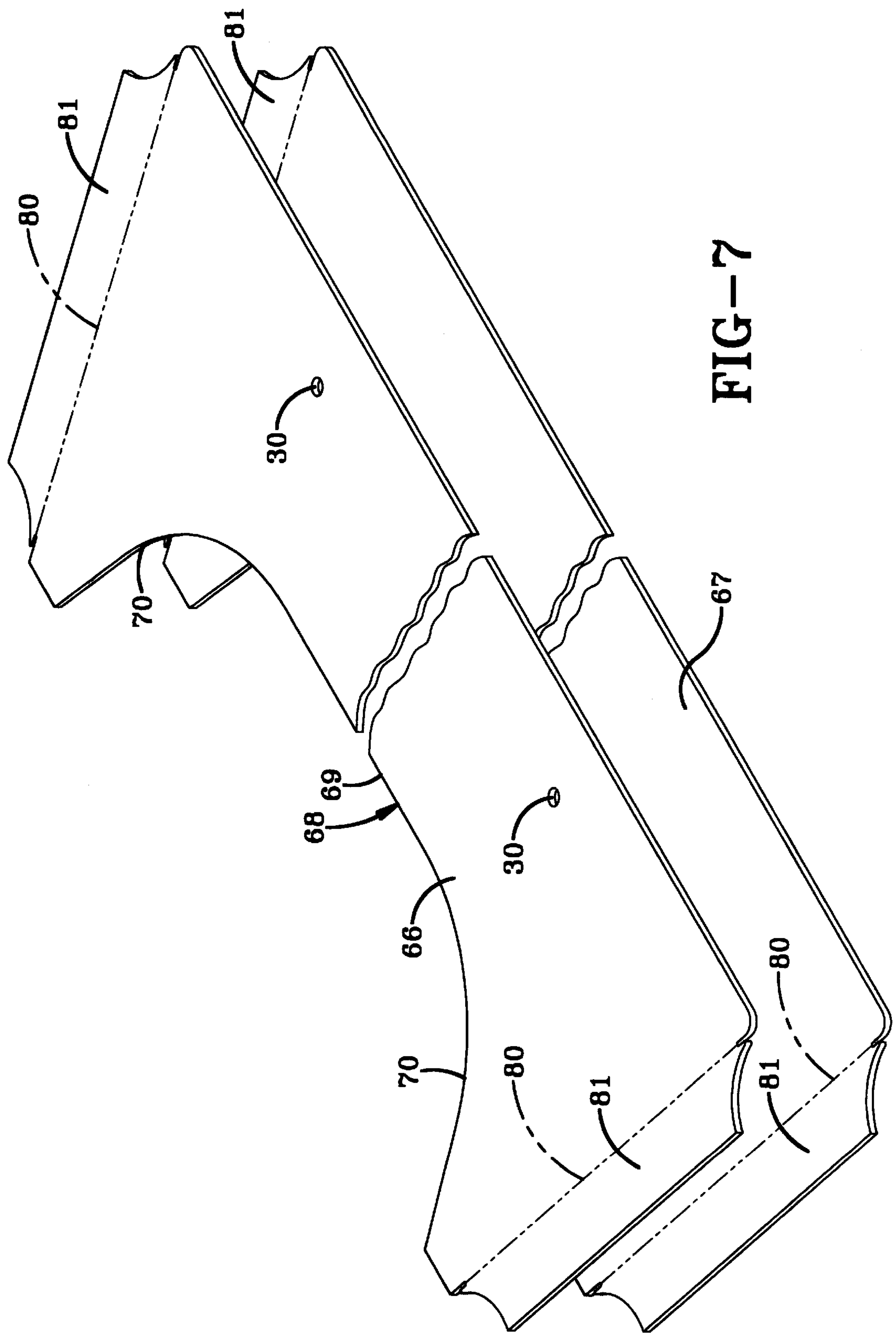
FIG. 7 is a perspective view of the top and bottom plates of a third embodiment of the present invention.
Figure 8:
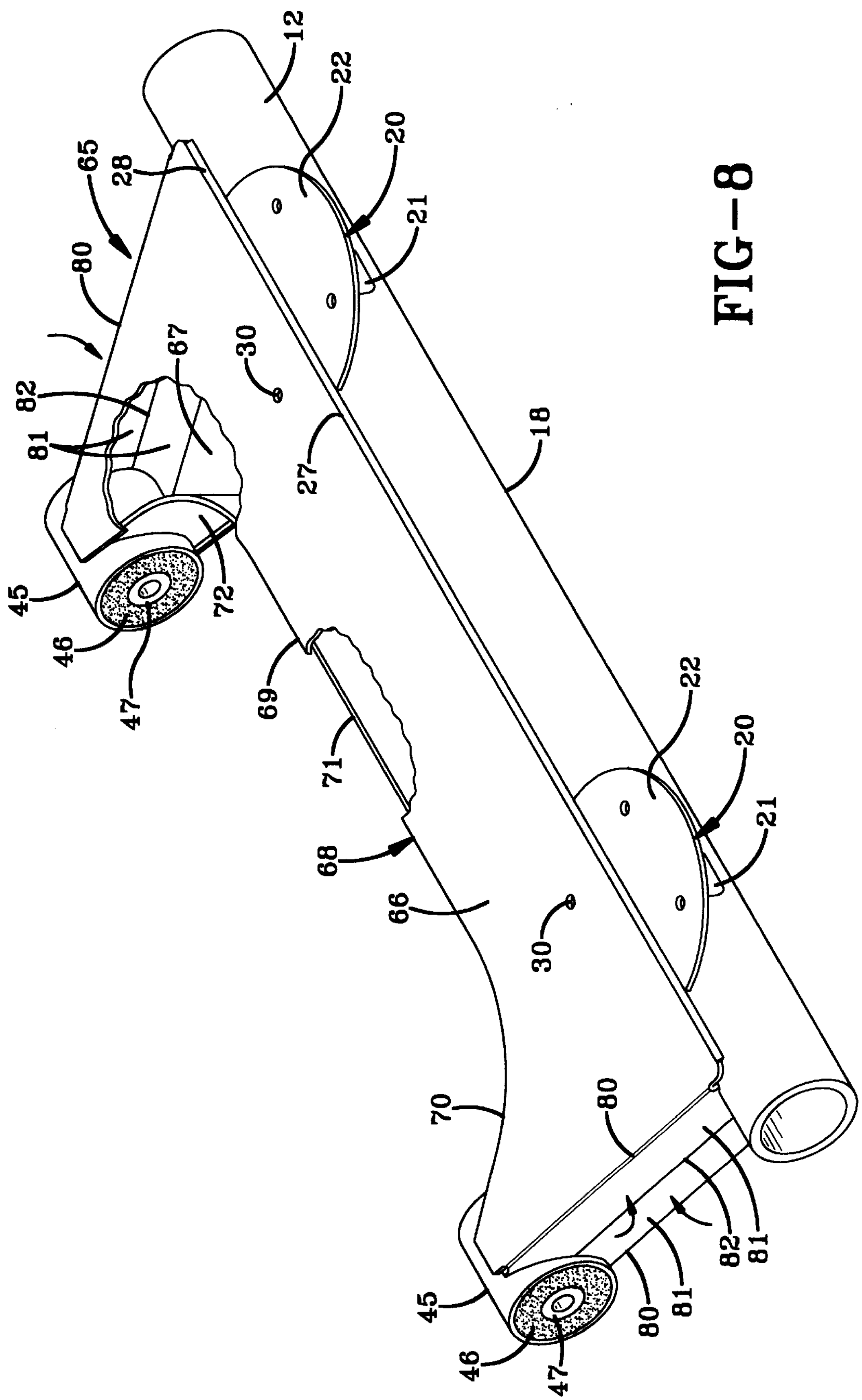
FIG. 8 is a enlarged perspective view of the beam unit of the third embodiment of the present invention.

Alternatively, top plate 66 and bottom plate 67 may be manufactured to include side walls 74. Referring to FIG. 7, top plate 66 and bottom plate 67 may be manufactured with a bend line 80 positioned adjacent each side and an end flange 81 formed adjacent each end of plates 66 and 67. Flanges 81 of top plate 66 may then be bent downwardly such that the free end of each flange 81 is moved into abutting relationships with corresponding flange 81 of bottom plate 67 at weld lines 82. A weld bead secures top plates 66 and 67 to one another, and offer additional stiffness to beam 65.

Accordingly, the invention described above, successfully overcomes problems associated with the art, and creates a suspension system which is roll stable, resistant to lateral and longitudinal forces, and may be tailored to be roll flexible or roll rigid depending on the particular requirements of vehicle 2. Moreover, the suspension system with the present invention provides an air ride suspension which is applicable as an auxiliary or primary suspension system, whether liftable or non-liftable. The suspension system of the present invention also almost eliminates the torque felt by the axle, and provides for a simple method of manufacture, as well as for a method of rigidizing the axle against bending forces.

Accordingly, the improved suspension system with integral box beam is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved suspension system with integral box beam is constructed and used, the characteristics of the construction, and the advantageous, new and useful results obtained; the new and useful structures, devices, elements, arrangements, parts and combinations, are set forth in the appended claims.

I claim:

1. A suspension system adapted to be mounted to a vehicle frame comprising:

a beam having spaced apart top and bottom plates with forward and rearward ends;

a pair of spaced apart pivots positioned adjacent the forward end of the beam and adapted to pivotally mount the beam to the vehicle frame;

an axle secured to the rearward end of the beam, the axle having a portion interposed between the top and bottom plates; and at least one spring adapted to extend between the vehicle frame and the beam.

2. The suspension system as defined in claim 1 in which the beam extends along the axle intermediate the pivots.

3. The suspension system as defined in claim 2 in which the axle is adapted to be supported from the vehicle frame by the beam, and in which the axle is free of any other interconnection with the vehicle frame.

4. The suspension system as defined in claim 2 in which the axle is secured to the rearward end of the beam by a weld bead.

5. The suspension system as defined in claim 2 in which the pivots are spaced apart in the range of from 30 to 60 inches.

6. The suspension system as defined in claim 2 in which at least one of the top plates and bottom plates extends to both pivots and the axle.

7. The suspension system as defined in claim 6 in which one of the top plates and bottom plates are secured to both pivots and the axle.

8. The suspension system as defined in claim 6 in which the interconnection of the axle and the beam substantially reduces torque into the axle.

9. The suspension system as defined in claim 2 in which one of the top plates and bottom plates extends continuously along the axle intermediate the pivots.

10. The suspension system as defined in claim 9 in which one of the top and bottom plates remains in continuous contact with the axle along the width of the beam.

11. The suspension system as defined in claim 2 in which at least one of the top plates and bottom plates is formed with a recess intermediate the pivots.

12. The suspension system as defined in claim 2 in which a front plate and a pair of end plates are positioned adjacent the top plate and bottom plate and in which the top plate, bottom plate, front plate and end plates define a hollow cavity within the beam.

13. The suspension system as defined in claim 12 in which one of the top plates and bottom plates is formed with a portion of at least one end plate.

14. The suspension system as defined in claim 1 in which the axle includes a top portion and a bottom portion secured to the top and bottom portions respectively by a top and bottom weld respectively.

15. The suspension system as defined in claim 14 in which the axle includes a vertical centerline, and in which the top weld and bottom weld are positioned within two inches of the vertical centerline.

16. The suspension system as defined in claim 15 in which at least one of the top and bottom welds is a continuous weld.

17. The suspension system as defined in claim 1 in which the pivots are spaced apart a first distance; and in which the axle is secured to the rearward end of the beam a second distance; and in which the second distance is at least 70% of the first distance.

18. The suspension system as defined in claim 1 in which each pivot includes a bushing.

19. The suspension system as defined in claim 18 in which each bushing includes a longitudinal spring rate, a vertical spring rate; and in which the horizontal spring rate is different from the vertical spring rate.

20. A suspension system adapted to be mounted to a vehicle frame comprising:

one beam having top and bottom plates with forward and rearward ends, a front plate and a pair of end plates positioned adjacent the top and bottom plates, at least one of the top and bottom plates including a portion of at least one of the end plates, the plates defining a hollow cavity within the beam;

a pair of spaced apart pivots positioned adjacent the forward end of the beam and adapted to pivotally mount the beam to the vehicle frame;

an axle secured to the rearward end of the beam, the beam extending along the axle intermediate the pivots, the axle being secured to the beam intermediate the pivots; and at least one spring adapted to extend between the vehicle frame and the beam.

21. A suspension system adapted to be mounted to a vehicle frame comprising:

one beam having a forward end and a rearward end;

a pair of spaced apart pivots positioned adjacent the forward end of the beam and adapted to pivotally mount the beam to the vehicle frame;

an axle secured to the rearward end of the beam by a weld bead; and at least one spring adapted to extend between the vehicle frame and the beam.

22. A suspension system adapted to be mounted to a vehicle frame comprising:

one beam having top and bottom plates with forward and rearward ends;

a pair of spaced apart pivots positioned adjacent the forward end of the beam and adapted to pivotally mount the beam to the vehicle frame;

an axle secured to the rearward end of one of the top and bottom plates which extends continuously along the axle intermediate the pivots, and the axle being secured to one of the top and bottom plates intermediate the pivots and being in continuous contact with the width of one of the top and bottom plates; and at least one spring adapted to extend between the vehicle frame and the beam.

23. A suspension system adapted to be mounted to a vehicle frame comprising:

one beam having a forward end and a rearward end;

a pair of spaced apart pivots positioned adjacent the forward end of the beam and adapted to pivotally mount the beam to the vehicle frame, each pivot including a bushing having a longitudinal spring rate and a vertical spring rate, and in which the horizontal spring rate is different from the vertical spring rate;

an axle secured to the rearward end of the beam; and at least one spring adapted to extend between the vehicle frame and the beam.

* * * * *